US012789229B2

(12) United States Patent
An et al.

(10) Patent No.: US 12,789,229 B2
(45) Date of Patent: Nov. 10, 2026

(54) METHOD FOR MANUFACTURING POROUS CARBON SURFACE WITH IMPROVED SUPERHYDROPHOBICITY AND DURABILITY

(71) Applicant: Andong National University Industry-Academic Cooperation Foundation, Andong-si (KR)

(72) Inventors: Tae Chang An, Yecheon-gun (KR); Do Yeon Im, Andong-si (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 715 days.

(21) Appl. No.: 18/172,399

(22) Filed: Feb. 22, 2023

(65) Prior Publication Data

US 2024/0033777 A1 Feb. 1, 2024

(30) Foreign Application Priority Data

Jul. 27, 2022 (KR) ........................ 10-2022-0093525

(51) Int. Cl.
*B05D 3/08* (2006.01)
*B05D 5/06* (2006.01)

(52) U.S. Cl.
CPC ............... *B05D 3/08* (2013.01); *B05D 5/061* (2013.01); *B05D 2518/00* (2013.01)

(58) Field of Classification Search
CPC ....... B05D 3/08; B05D 5/061; B05D 2518/00
USPC .......................................................... 106/122
See application file for complete search history.

(56) References Cited

FOREIGN PATENT DOCUMENTS

WO WO-2011063392 A2 * 5/2011 ........ B01J 20/28004

OTHER PUBLICATIONS

Seo et al. "Candle-based process for creating a stable superhydrophobic surface". Carbon 68 (2014) 583-596. (Year: 2014).*
Matthai et al. "The Quality Candle". (2004) p. 1-32. (Year: 2004).*

* cited by examiner

*Primary Examiner* — Coris Fung
*Assistant Examiner* — Catriona M Corallo
(74) *Attorney, Agent, or Firm* — You & IP, LLC

(57) ABSTRACT

Proposed is a method for manufacturing a porous carbon surface with improved superhydrophobicity and durability and a method for manufacturing a porous carbon surface with further improved superhydrophobicity and durability of a substrate coated with carbon nanoparticles on the surface using a vapor treatment process. According to the present disclosure, by agglomerating nano-sized carbon particles into a micro-nano composite structure through a simple process of treating a vapor of water, an organic solvent, or a mixture thereof, a porous carbon surface with improved superhydrophobicity and durability with low surface energy and high roughness can be manufactured, and a substrate including the porous carbon surface. This process can be efficiently used in mass production processes in various industrial fields that can utilize porous carbon surfaces because the manufacturing process is simple and inexpensive.

9 Claims, 5 Drawing Sheets

METHOD FOR MANUFACTURING POROUS CARBON SURFACE WITH IMPROVED SUPERHYDROPHOBICITY AND DURABILITY

CROSS REFERENCE TO RELATED APPLICATION

The present application claims priority to Korean Patent Application No. 10-2022-0093525, filed Jul. 27, 2022, the entire contents of which is incorporated herein for all purposes by this reference.

STATEMENT REGARDING GOVERNMENT SPONSORED RESEARCH

This invention was made with Korean government support under “Mid-Career Researcher Program (MSIT)” awarded by Ministry of Science and ICT, and National Research Foundation of Korea.

BACKGROUND OF THE INVENTION

Field of the Invention

The present disclosure relates to a method for manufacturing a porous carbon surface with improved superhydrophobicity and durability and to a method for manufacturing a porous carbon surface with further improved superhydrophobicity and durability of a substrate coated with carbon nanoparticles on the surface using a vapor treatment process.

Description of the Related Art

Porous carbon surface fabrication technology can be widely applied to solar electrodes or oil-water separation industries, and the most important indicators for evaluating such porous carbon surfaces are superhydrophobicity and durability. A superhydrophobic surface means that the contact angle of the surface with water droplets is 150° or more, and a superhydrophobic surface allows water droplets to roll off from the surface at an inclination of 10° or less. These surfaces have extreme water repellency and very low contact angle hysteresis because the actual solid surface and water contact area are very small.

Since only a physical bond exists on a general carbon surface, it is difficult to control damage and peeling, and there is a need to develop a technology that effectively improves the damage. Conventional carbon surface manufacturing methods use carbon-based materials such as carbon nanotubes, graphene, etc., but this method is difficult to use industrially due to high prices, mass production limitations, and complicated process. In order to solve the above problems, a method of manufacturing a carbon surface using candle soot has been reported. The method using candle soot has advantages such as a simple process, low manufacturing cost, excellent heat resistance, anti-corrosion performance, and easy extraction of materials. However, this method also has a limitation in that durability is not good, and a technology capable of supplementing this problem is required.

SUMMARY OF THE INVENTION

Accordingly, these inventors confirmed that a porous micro-nanostructure agglomeration could be formed through a vapor treatment process while studying a method to further improve durability and superhydrophobic properties while maintaining the existing advantages of a substrate coated with carbon nanoparticles through paraffin coating and incomplete combustion.

Therefore, this disclosure is to provide a method of manufacturing porous carbon surfaces with improved superhydrophobicity and durability, including treating a substrate on which carbon nanoparticles are coated on the surface with a vapor of water, an organic solvent, or a mixture thereof through paraffin coating and incomplete combustion.

In order to achieve the above objective, the present disclosure provides a method of manufacturing a porous carbon surface with improved superhydrophobicity and durability, including treating a substrate on which carbon nanoparticles are coated on the surface with a vapor of water, an organic solvent, or a mixture thereof through paraffin coating and incomplete combustion.

In addition, the present disclosure provides a substrate including a porous carbon surface with enhanced superhydrophobicity and durability manufactured by the above manufacturing method.

According to the present disclosure, by agglomerating nano-sized carbon particles into a micro-nano composite structure through a simple process of treating a vapor of water, an organic solvent, or a mixture thereof, a porous carbon surface with improved superhydrophobicity and durability with low surface energy and high roughness and a substrate including the porous carbon surface can be manufactured. This process can be efficiently used in mass production processes in various industrial fields that can utilize porous carbon surfaces because the manufacturing process is simple and inexpensive.

BRIEF DESCRIPTION OF THE DRAWINGS

FIG. 1B represents a SEM image of the additional process untreated control group, FIG. 1C represents a photograph of the DI water immersion treatment experimental group, FIG. 1D represents a photograph of the ethanol immersion treatment experimental group, FIG. 1E represents the SEM image of the DI water immersion treatment group, FIG. 1F represents the SEM image of the DI water vapor treatment experimental group, FIG. 1G represents the SEM image of the ethanol immersion treatment experimental group, and FIG. 1H represents the SEM image of the ethanol vapor treatment experimental group, respectively;

FIG. 2D is a view showing the contact angle measured therefrom;

(FIG. 3A: untreated control group, FIG. 3B: DI water vapor treatment experimental group, FIG. 3C: ethanol vapor treatment experimental group, insertion image is SEM image of carbon nanoparticles before droplet impact test);

FIG. 5A: untreated control group, FIG. 5B: 4° C., FIG. 5C: 20° C., FIG. 5D: 60° C. treatment)

DESCRIPTION OF THE PREFERRED EMBODIMENTS

Figure 1A:
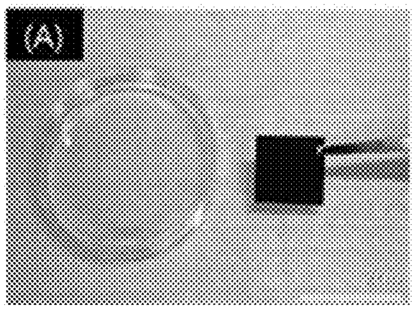
FIG. 1A-1H is a photograph of the carbon surface structure change according to the additional treatment process and a SEM photograph of the surface; in FIG. LA represents a photograph of the additional process untreated control group.
Figure 1B:
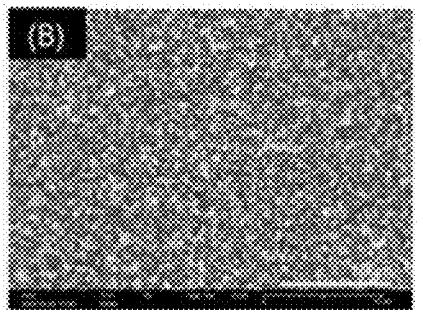

The present disclosure relates to a method for manufacturing a porous carbon surface having enhanced superhydrophobicity and durability, including treating a substrate on which carbon nanoparticles are coated on the surface with a vapor of water, an organic solvent, or a mixture thereof through paraffin coating and incomplete combustion and relates to a substrate including the porous carbon surface manufactured by the method.

According to the manufacturing method of the present disclosure, nano-sized carbon particles are agglomerated in a micro-nano composite structure, thereby manufacturing a porous carbon surface having low surface energy and high roughness and a substrate including the same.

Hereinafter, the present disclosure will be described in detail.

The present disclosure provides a method of manufacturing a porous carbon surface with improved superhydrophobicity and durability, including treating a substrate on which carbon nanoparticles are coated on the surface with a vapor of water, an organic solvent, or a mixture thereof through paraffin coating and incomplete combustion.

The substrate on which carbon nanoparticles are coated on the surface through paraffin coating and incomplete combustion refers to a substrate on which carbon nanoparticles having hydrophobic properties generated through incomplete combustion, commonly referred to as soot, are fixed.

Soot particles produced through incomplete combustion have a simple and inexpensive manufacturing process but have a disadvantage in that they have a very low resistance to water because only physical bonds are formed between carbon nanoparticles. The substrate coated with carbon nanoparticles on the surface through paraffin coating and incomplete combustion is a substrate with relatively high superhydrophobic properties compared to a substrate in which only soot particles are fixed on the substrate. Specifically, compared to a substrate coated with porous carbon nanoparticles only through incomplete combustion without a paraffin wax pretreatment process, nano-sized soot particles are relatively fixed stably through paraffin wax coating and incomplete combustion steps.

The present disclosure further includes treating a vapor of water, an organic solvent, or a mixture thereof in order to improve the superhydrophobicity of the "substrate coated with carbon nanoparticles on the surface" through paraffin coating and incomplete combustion and improve durability, which is a disadvantage thereof.

As described above, the additional process of treating a vapor of water, organic solvent, or a mixture thereof enables effective penetration, compared to immersion treatment which is difficult to penetrate into the porous structure of carbon nanoparticles. In addition, the immersion process uniformly compresses the carbon nanoparticles throughout the surface tension during evaporation after penetration, foaming a flat structure as a whole, and reducing surface roughness, which does not induce an effective increase in surface superhydrophobicity. However, when the vapor treatment process of the present disclosure is used, vapor easily penetrates into a porous structure to form condensed droplets on the surface, and carbon nanoparticles in the droplets are agglomerated by surface tension in the process of evaporating the condensed droplets. Therefore, a uniform micro-nano-layer structure similar to droplets condensed on the surface, that is, a surface structure in which craters and protrusions of several micrometer sizes appear repeatedly, can be formed.

Among the vapor of the water, organic solvent, or mixture thereof, the organic solvent may be one selected from the group consisting of lower alcohol having 1 to 4 carbon atoms, methanol, ethanol, butanol, isopropyl alcohol, pentane, hexane, heptane, cyclohexane, toluene, acetone, methyl acetate, methylene chloride, chloroform, ether, petroleum ether, benzene, ethylene glycol, propylene glycol, and butylene glycol, preferably may be a vapor of water, ethanol, or isopropyl alcohol, and more preferably may be a vapor of ethanol. In a preferred embodiment of the present disclosure, a vapor of water and 99% (v/v) or more ethanol were used.

The vapor treatment may be performed at a temperature condition in a range of 4° C. to 30° C., which induces condensation of vapor on the surface of the substrate and may vary depending on the type of vapor selected but may be performed at a temperature condition in a range of 4° C. to 30° C., preferably 4° C. to 25° C., more preferably 4° C. to 15° C.

The temperature condition of the vapor treatment may be adjusted according to the temperature of the substrate and the type of vapor selected. In order to achieve the objectives and effects of the present disclosure, it is preferable to select a temperature at which vapor may be condensed on the surface of the substrate to form droplets. As the amount of vapor condensed on the surface of the substrate increases due to the temperature lower than the boiling point of the selected vapor, large droplets may be formed on the surface of the substrate, and the agglomeration range and the number of nanoparticles may increase.

In particular, porous carbon surfaces manufactured by vapor treatment under low-temperature conditions compared to surfaces manufactured by vapor treatment under high-temperature conditions can form a uniform micro-nano layer structure similar to droplets condensed on the surface, i.e., a surface structure in which craters and projections of several lam sizes appear repeatedly.

The vapor treatment as described above may be performed on the substrate for 5 to 10 minutes.

The vapor treatment of the present disclosure may change the geometric shape of carbon nanoparticles, which is a cause of degradation in durability, into a micro-nanostructure, thereby further improving superhydrophobic properties and durability.

In the present disclosure, the substrate coated with carbon nanoparticles on the surface through the paraffin coating and incomplete combustion may be manufactured through the following processes:

coating the surface of the substrate with paraffin wax; and scorching the surface of the coated substrate with a flame at 800° C. to 1400° C. to coat the surface with carbon nanoparticles through incomplete combustion.

Coating the surface of the substrate with paraffin wax is a pretreatment step for fixing the carbon nanoparticles, and a method used in the art, such as the molten paraffin wax is applied to the surface of the substrate, the substrate is immersed in molten paraffin wax, or rubbing wax on the surface of the substrate, may be used without limitation, and it is preferable to uniformly coat the surface of the substrate.

Scorching the surface of the coated substrate with a flame at 800° C. to 1400° C. to coat the surface with carbon nanoparticles through incomplete combustion is achieved by a process in which a carbon nanoparticle layer generated by incomplete combustion is accumulated on the substrate surface layer, and at the same time, paraffin wax coated by flame evaporates as it passes through the nanoparticle layer. That is, when the substrate is maintained at room temperature again after the process of treating the substrate with a flame of 800° C. to 1400° C., the paraffin wax turns into a solid state again, and the paraffin wax allows the formed nanoparticles to be held more stably on the substrate surface.

In the present disclosure, incomplete combustion may be performed by an incomplete combustion induction method known in the art. For example, it may be performed by placing a paraffin-coated substrate in the middle position of a flame or by reducing the oxygen concentration during combustion, preferably by placing a paraffin-coated substrate in the middle position of a flame at 800° C. to 1400° C. The flame may include, without limitation, a flame capable of applying the above-described temperature to a substrate and inducing incomplete combustion, for example, an alcohol lamp, a torch, or a candle flame, and in a preferred embodiment of the present disclosure, a candle flame is used.

The substrate used in the present disclosure may be glass, plastic, or metal, and an aluminum substrate is used in a preferred embodiment of the present disclosure.

In addition, the present disclosure provides a substrate including a porous carbon surface with enhanced superhydrophobicity and durability manufactured by the above-described manufacturing method.

The substrate, including the porous carbon surface, is a substrate having a porous micro-nano-carbon structure formed on a surface thereof and has low surface energy and high roughness and improved superhydrophobicity and durability compared to a substrate before vapor treatment of water, an organic solvent, or a mixture thereof.

More specifically, the porous carbon surface may exhibit a contact angle of 150° or more and maintain a contact angle of 110°, preferably 120° or more, even in an external stimulus.

Redundant content is omitted in consideration of the complexity of the present specification, and terms not otherwise defined herein have meanings commonly used in the technical field to which the present disclosure belongs.

Hereinafter, the present disclosure will be described in detail with reference to embodiments. However, the examples described below are provided only to aid understanding of the present disclosure and thus should not be construed as limiting to the scope of the present disclosure.

Example 1. Fabrication of Improved Porous Carbon Surfaces

A porous carbon surface fabrication with enhanced durability was performed using candle soot. In order to compensate for the disadvantages of the existing porous carbon surface using candle soot, a vapor treatment process was added. First, an aluminum substrate (0.2 mm) cut to a size of 2 cm×2 cm was prepared, and paraffin wax was coated on the surface. The substrate coated with paraffin wax was brought into contact with an inner flame of a candle at 800° C. to 1400° C., and the surface was scorched for 1 minute to induce incomplete combustion. Carbon nanoparticles were deposited on the surface of the substrate through the scorching process, and a superhydrophobic coating layer was prepared.

In the present disclosure, in order to increase the durability of the substrate coated with carbon nanoparticles manufactured through such a process, the substrate of the present disclosure was immersed in DI water or 99.5% ethanol (ethyl alcohol, ACS agent, 9999.5% (v/v)) or DI water vapor or ethanol vapor was treated on the manufactured substrate (hereinafter, an additional treatment process) to evaluate the change of the carbon surface contact angle and the porous surface durability. A dust-free paper was laid on the petri dish, and 2 ml of ethanol was poured to allow ethanol evaporation to proceed stably. An aluminum substrate coated with carbon soot was fixed to a lid facing down and covered a petri dish containing ethanol to form a sealed environment filled with ethanol vapor. Treatment of each experimental group was performed at a low temperature of 4° C. for 5 minutes. The carbon soot substrate, after the ethanol vapor treatment, was left at room temperature for 30 minutes to evaporate the ethanol condensed on the surface.

Example 2. Check the Porous Carbon Surface Change According to the Additional Treatment Process A photograph of a change in the carbon surface structure according to each additional treatment process of Example 1 and SEM results are shown in FIG. 1A~1H.

Figure 1C:
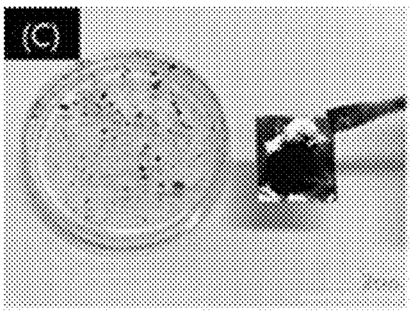
Figure 1D:
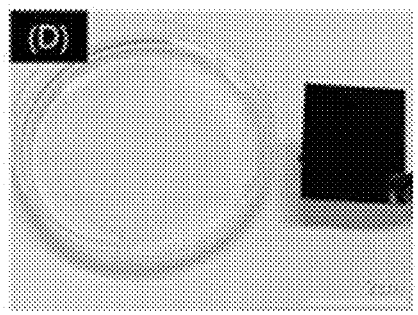
Figure 1E:
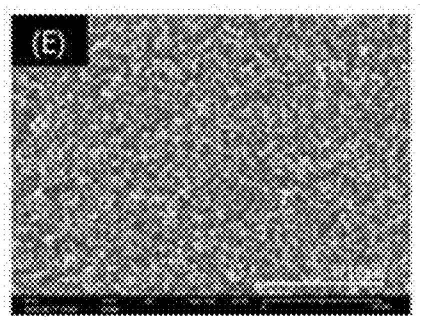
Figure 1F:
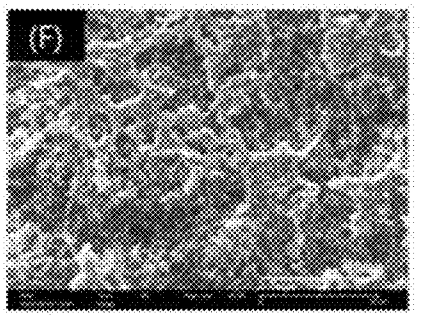
Figure 1G:
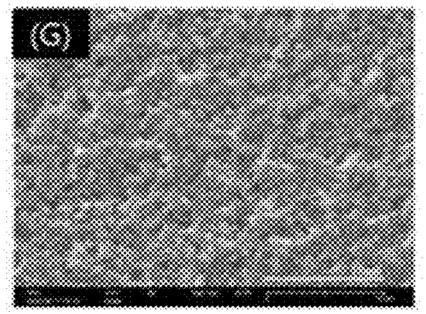
Figure 1H:
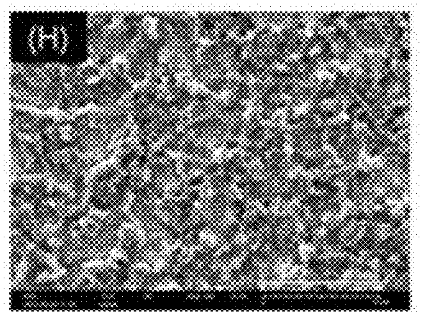

As shown in FIG. 1A~1H, in the case of a substrate immersed in DI water, the water did not penetrate a porous structure of hydrophobic carbon nanoparticles, and a large change in the structure of the carbon nanoparticles did not occur. Rather, water penetrated between the aluminum substrate and the carbon surface, and the carbon soot structure was peeled off (FIG. 1C and FIG. 1E). On the other hand, when immersed in lipophilic ethanol, the carbon nanoparticles were not separated from the substrate surface, while the ethanol stably penetrated into the porous structure (FIG. 1D). In addition, it was confirmed that ethanol penetrating the porous structure exhibits a planar surface structure as the carbon nanoparticles are uniformly compressed overall due to surface tension in the evaporation process (FIG. 1G). This surface structure reduces the roughness of the surface, which limits the ability to produce a superhydrophobic surface.

On the other hand, in the experimental group treated with DI water vapor (FIG. 1F) and ethanol vapor (FIG. 1G), a structure in which carbon nanoparticles were irregularly agglomerated was confirmed, which indicates that a surface structure with increased surface roughness can be prepared. Unlike the liquid state, the DI water vapor treatment group easily penetrated the porous structure and formed condensed droplets on the surface. However, the hydrophobic carbon nanoparticle structure hindered the formation of uniform and stable droplets, and the carbon nanoparticles on the surface showed an irregularly agglomerated structure. In the experimental group treated with ethanol vapor, ethanol vapor penetrating between carbon nanoparticles forms ethanol droplets stably and uniformly condensed on the surface of the substrate. It was confirmed that, in the process of evaporating the condensed ethanol droplets, the carbon nanoparticles in the droplets were agglomerated by surface tension, and a uniform micro-nano hierarchical structure similar to the ethanol droplets condensed on a surface is formed.

Example 3. Carbon Surface Contact Angle Analysis According to the Additional Treatment Process In order to confirm the superhydrophobicity of the carbon surface treated with DI water vapor and ethanol vapor, 10 μl water droplets were placed on the substrate, and the water droplets were photographed using a macro-optical camera (Nikon, D800, 60 mm Macro Lens), and Image J (contact angle plugin) program was used to measure the contact angle for each water droplets. As an untreated control group, a porous carbon surface prepared through a candle soot process without further treatment was used. The appearance of water droplets on the substrate and the results of measuring the contact angle are shown in FIG. 2A~2D.

Figure 2A:
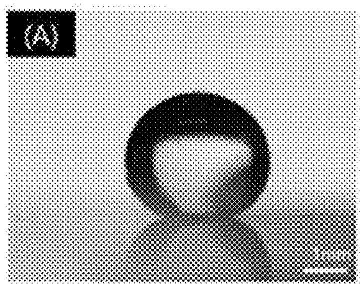
FIG. 2A-2D shows the appearance of water droplets on the substrate of the additional process untreated control group FIG. 2A, ethanol vapor treatment experimental group FIG. 2B, and DI water vapor treatment experimental group FIG. 2C.
Figure 2B:
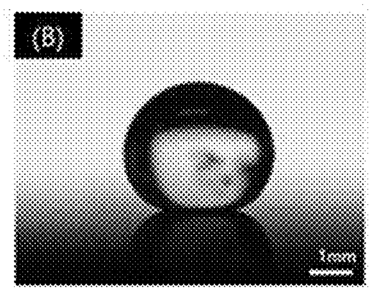
Figure 2C:
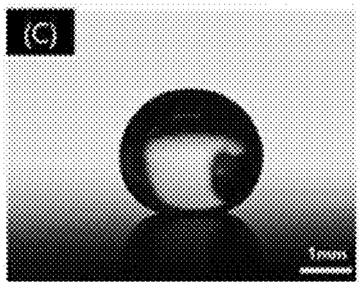
Figure 2D:
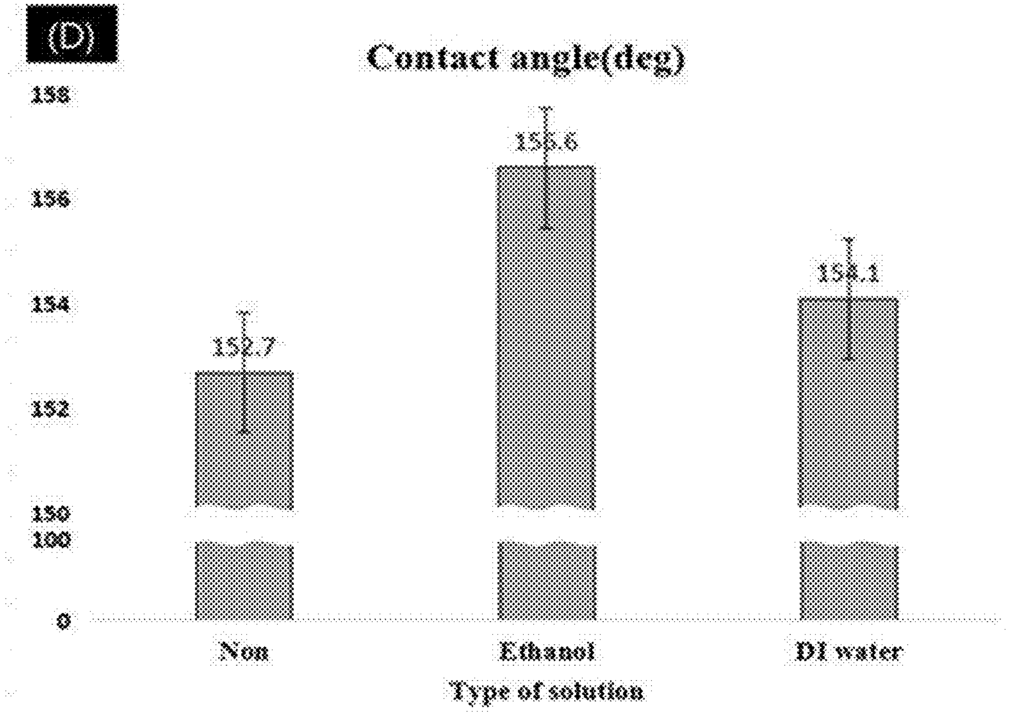

FIG. 2A to FIG. 2C are photographs of the water droplets of the untreated control group, the ethanol vapor treatment group, and the DI water vapor treatment group, respectively. As shown in FIG. 2D, the contact angle of the untreated control group (none) is 152.7°, the ethanol vapor treatment group (ethanol) showed 156.6°, and the DI water vapor treatment group showed 154.1°. These results show that the contact angle increases as the roughness of the surface changes by treatment with ethanol vapor and DI water vapor. In particular, it was confirmed that carbon nanoparticles were rearranged in a micro-nano layer structure in the ethanol vapor-treated substrate, and air cushions were stably formed between the liquid and the solid, reducing the contact area between the liquid and the solid, resulting in high superhydrophobic properties.

Example 4. Porous Carbon Surface Durability Evaluation

A water droplet impact test was performed to evaluate durability whether the superhydrophobic properties of the porous carbon surface prepared by the method of the present disclosure were well maintained even against external impacts. The droplet impact test can simultaneously evaluate the durability of the surface structure and the dynamic safety of superhydrophobic surfaces due to the impact force and pressure generated during the collision. Total of 10 ml of water droplets of about 50 μl was dropped from 10 cm above the substrate at a pressure of 1 kPa, and then the structure of the surface and the change in contact angle were measured.

Figure 3A:
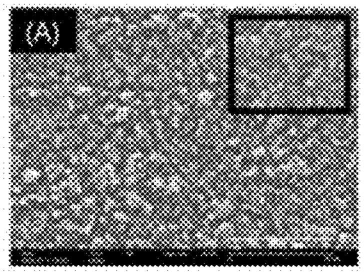
FIG. 3A-3C is a view showing the results of confirming the change in the surface structure of each experimental group by SEM before and after the water droplet impact test
Figure 3B:
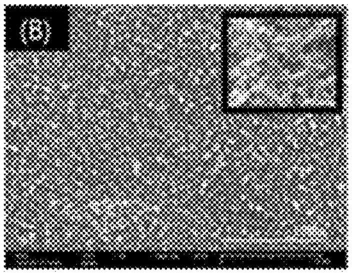
Figure 3C:
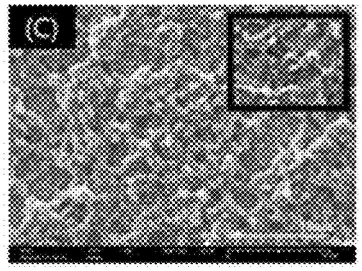

A porous carbon surface prepared through a candle soot process without additional treatment was used as an untreated control group, and the results of confirming the porous carbon surface change of DI water vapor and ethanol vapor treatment groups through SEM image analysis are shown in FIG. 3A~3C.

As shown in FIG. 3A~3C, in the case of the control group FIG. 3A and the DI water vapor treatment group FIG. 3B, agglomeration of the carbon nanoparticles and damage to the surface structure was observed by water droplets repeatedly falling on the substrate. On the other hand, it was confirmed that the porous nanostructure was stably maintained in the ethanol vapor treatment group FIG. 3C.

Figure 4:
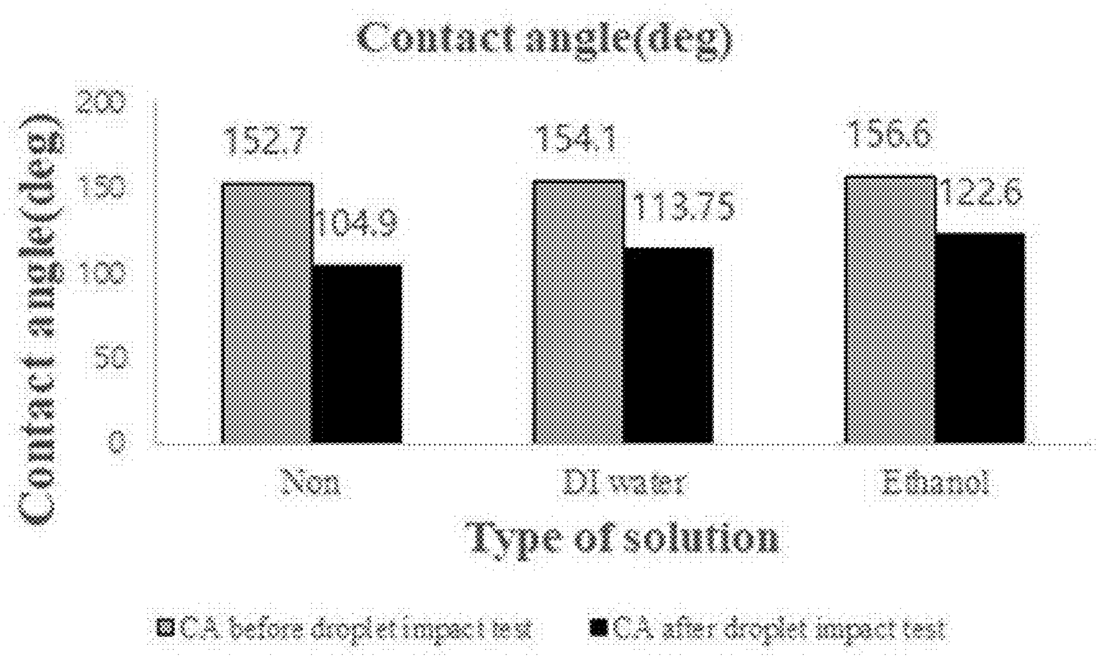
FIG. 4 is a view showing the change in contact angle of each experimental group before and after a water droplet impact test.

The results of confirming the change in contact angle after the droplet impact test are shown in FIG. 4.

As shown in FIG. 4, the contact angle of the control group (none) decreased sharply from 152.7° to 104.9°, but the DI water vapor and ethanol vapor treatment group showed little reduction in contact angle, especially in the ethanol vapor treatment group. These results show that the formed micro-nano hierarchical structure is much better maintained despite external stimulus, that is, the durability is improved when the additional treatment process of DI water vapor and ethanol vapor, especially ethanol vapor is used.

Example 5. Confirmation of Carbon Surface Structure Change According to a Vapor Treatment Temperature Through the above examples, it was confirmed that excellent superhydrophobicity and durability were achieved, especially when the ethanol vapor treatment process was added. Therefore, in order to compare the structural changes according to the difference in ethanol condensation by temperature, ethanol vapor treatment was performed in different temperature environments for 5 minutes. The temperature conditions were set to low temperature (4° C.), room temperature (20° C.), and high temperature (60° C.) in consideration of the condensation environment of ethanol with a boiling point of 78° C.

In the same manner as in Example 1, the substrate coated with paraffin wax was brought into contact with the flame of a candle, and incomplete combustion was induced by scorching the surface. Carbon nanoparticles were deposited on the surface of the substrate through the scorching process, and a superhydrophobic coating layer was prepared. Thereafter, ethanol vapor was treated on the substrate for minutes, and only the treatment temperature was changed to 4° C., 20° C., and 60° C. Ethanol was evaporated, a porous micro-nano-carbon structure was prepared, and the surface structure at each temperature condition was photographed by SEM, and the results are shown in FIG. 5A~5D.

Figure 5A:
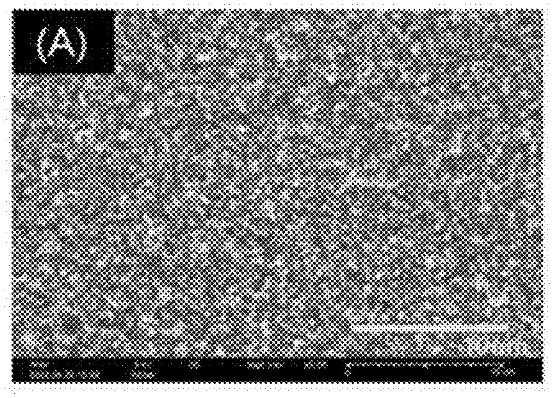
FIG. 5A-5D is a view showing the results of the SEM image of the surface structure of porous micro-nano carbon structure substrates formed by varying the ethanol vapor treatment temperature
Figure 5B:
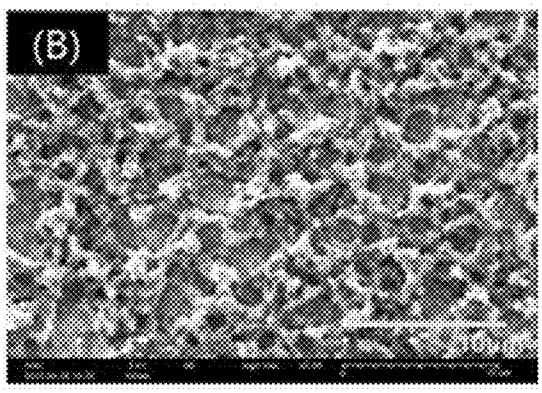
Figure 5C:
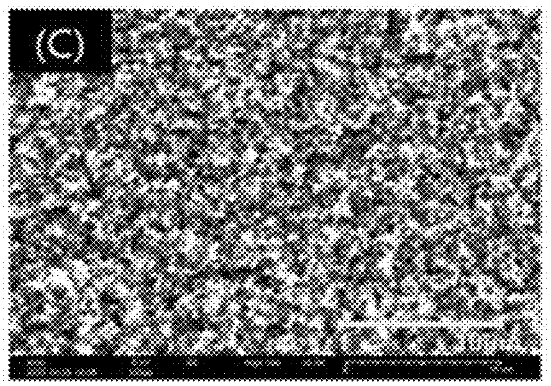
Figure 5D:
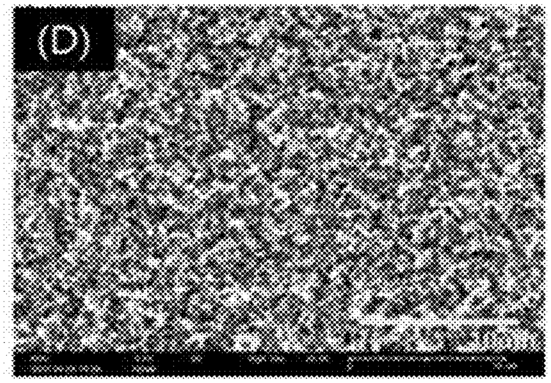
Figure 6:
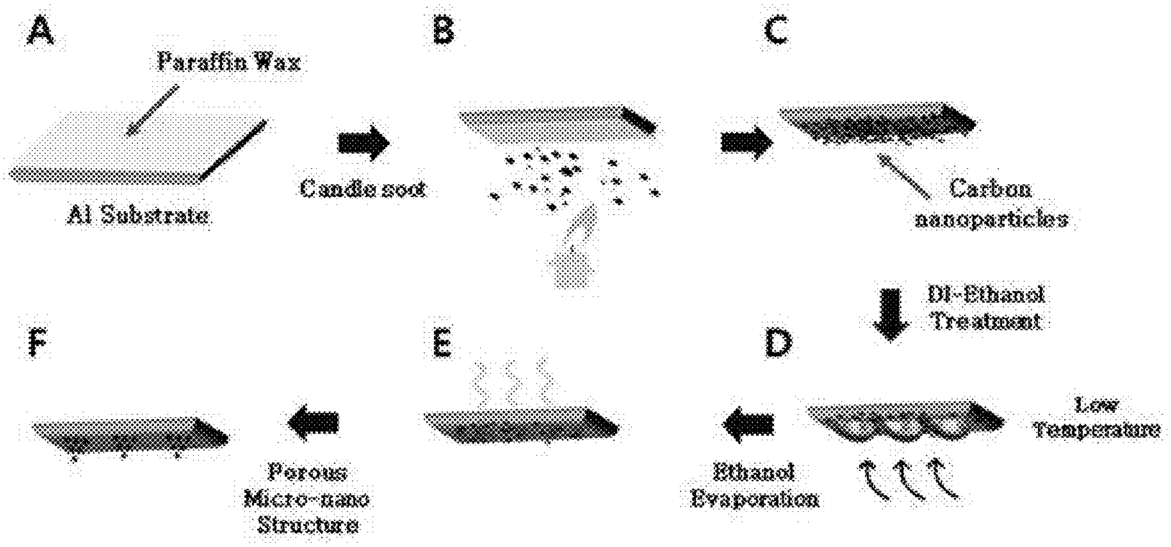
FIG. 6 is a schematic diagram showing a method for manufacturing an improved porous micro-nano carbon surface, including the vapor treatment process of the present disclosure.

As shown in FIG. 5A~5D, as the temperature increased to the additional process untreated control group FIG. 5A, the 4° C. low-temperature vapor treatment group FIG. 5B, the 20° C. high-temperature vapor treatment group FIG. 5C, and the 60° C. high-temperature vapor treatment group FIG. 5D, the agglomeration of carbon nanoparticles occurred slightly. In the control group FIG. 5A untreated by the additional process, a structure in which particles of several hundred nanometers were entangled was confirmed. In the low-temperature vapor treatment group FIG. 5A at 4° C., the amount of condensation of ethanol vapor on the substrate surface increased due to the low temperature, resulting in the formation of large droplets, and several micrometer-sized craters and protrusions were regularly observed. In the experimental group treated by raising the vapor treatment temperature to 20° C. or 60° C., it was confirmed that the size of the ethanol droplets decreased as the treatment temperature increased, and thus the agglomeration of the nanoparticles decreased. As a result, it was confirmed that as the temperature increased, the extent and amount of agglomeration of carbon nanoparticles could be reduced, and as the temperature of ethanol vapor treatment was lowered, a complex structure was formed, and durability could be improved.

Although specific parts of the present disclosure have been described in detail, it should be apparent to those skilled in the art that such specific descriptions merely present preferred embodiments and thus the scope of the present disclosure is not limited thereto. Therefore, it will be said that the practical scope of the present disclosure is defined by the appended claims and their equivalents.

What is claimed is:

1. A method for manufacturing a porous carbon surface with superhydrophobicity and durability, the method comprising:

coating a substrate with carbon nanoparticles through paraffin coating and incomplete combustion; and treating the coated substrate with a vapor of water, an organic solvent, or a mixture thereof, wherein the vapor treatment is performed at a temperature of 4° C. to 15° C. to induce condensation of the vapor on a surface of the substrate.

2. The method of claim 1, wherein the organic solvent is an organic solvent selected from the group consisting of lower alcohol having 1 to 4 carbon atoms, methanol, ethanol, butanol, isopropyl alcohol, pentane, hexane, heptane, cyclohexane, toluene, acetone, methyl acetate, methylene chloride, chloroform, ether, petroleum ether, benzene, ethylene glycol, propylene glycol, and butylene glycol.

3. The method of claim 1, wherein the porous carbon surface manufactured by the method has regularly formed craters and protrusions.

4. The method of claim 1, wherein the vapor treatment is performed for 5 to 10 minutes.

5. The method of claim 1, wherein the porous carbon surface has an agglomerated porous micro-nano-structure.

6. The method of claim 1, wherein the coating is performed through following processes:

coating paraffin wax on the surface of the substrate; and scorching the surface of the coated substrate with a flame at 800° C. to 1400° C. to coat the surface with carbon nanoparticles through incomplete combustion.

7. The method of claim 6, wherein the flame is a candle flame.

8. The method of claim 1, wherein the incomplete combustion is induced by placing a paraffin-coated substrate in a middle position of a flame.

9. The method of claim 1, wherein the substrate is made of glass, plastic, or metal.

* * * * *